United States Patent
Matsumoto

(10) Patent No.: US 9,142,828 B2
(45) Date of Patent: Sep. 22, 2015

(54) FUSE UNIT FOR VEHICLES

(75) Inventor: Yusuke Matsumoto, Makinohara (JP)

(73) Assignee: Yazaki Corporation, Tokyo (JP)

( * ) Notice: Subject to any disclaimer, the term of this patent is extended or adjusted under 35 U.S.C. 154(b) by 45 days.

(21) Appl. No.: 14/007,958

(22) PCT Filed: Mar. 21, 2012

(86) PCT No.: PCT/JP2012/001938
§ 371 (c)(1),
(2), (4) Date: Sep. 26, 2013

(87) PCT Pub. No.: WO2012/132326
PCT Pub. Date: Oct. 4, 2012

(65) Prior Publication Data
US 2014/0017529 A1  Jan. 16, 2014

(30) Foreign Application Priority Data

Mar. 31, 2011 (JP) ................. 2011-078460

(51) Int. Cl.
*H01M 2/34* (2006.01)
*B60R 16/023* (2006.01)
*H01H 85/02* (2006.01)

(52) U.S. Cl.
CPC ........... *H01M 2/347* (2013.01); *B60R 16/0238* (2013.01); *H01H 2085/025* (2013.01)

(58) Field of Classification Search
None
See application file for complete search history.

(56) References Cited

U.S. PATENT DOCUMENTS

| 5,643,693 A | 7/1997 | Hill et al. |
|---|---|---|
| 7,978,046 B2 | 7/2011 | Ohashi et al. |
| 2001/0011939 A1 | 8/2001 | Inaba et al. |
| 2001/0027063 A1 | 10/2001 | Wakata et al. |
| 2002/0134572 A1 | 9/2002 | Matsumura |
| 2005/0116806 A1 | 6/2005 | Iwata |
| 2009/0108982 A1* | 4/2009 | Ohashi et al. .......... 337/191 |
| 2009/0111316 A1 | 4/2009 | Matsumoto et al. |

FOREIGN PATENT DOCUMENTS

| CN | 201749831 U | 2/2011 |
|---|---|---|
| DE | 102008053836 A1 | 6/2009 |
| EP | 1239506 A2 | 9/2002 |
| FR | 2 923 077 | 5/2009 |
| JP | 2001297683 A | 10/2001 |
| JP | 2002-289171 | 10/2002 |
| JP | 2009110843 A | 5/2009 |

OTHER PUBLICATIONS

Communication dated Oct. 6, 2014 from the Korean Patent Office in counterpart application No. 1020137028437.
(Continued)

*Primary Examiner* — Patrick Ryan
*Assistant Examiner* — Wyatt McConnell
(74) *Attorney, Agent, or Firm* — Sughrue Mion, PLLC

(57) ABSTRACT

A fuse unit (1) includes a unit body (10) fixed to a battery post (3) of a battery (2) via a battery terminal (4) and disposed along a top surface (2a) and a side surface (2b) of the battery (2), and a battery cover (20) mounted to the unit body (10) and configured to cover an outer periphery of the unit body (10). The unit body (10) has a battery abutment rib (17) at a portion of the unit body (10) facing the side surface (2b) of the battery (2). The battery abutment rib (17) is configured to secure a mounting space for the battery cover (20).

4 Claims, 5 Drawing Sheets

(56) References Cited

OTHER PUBLICATIONS

Office Action issued on Nov. 11, 2013 in the counterpart German application.
Communication dated Feb. 13, 2015 from the State Intellectual Property Office of People's Republic of China in counterpart Application No. 201280015530.2.
Communication dated Nov. 4, 2014 from the Japanese Patent Office in counterpart application No. 2011-078460.
Written Opinion of the International Searching Authority mailed Aug. 21. 2012 from the European Patent Office for PCT/JP2012/001938.
International Search Report mailed Aug. 21, 2012 from the European Patent Office for PCT/JP2012/001938.

* cited by examiner (a)

(b)

FUSE UNIT FOR VEHICLES

TECHNICAL FIELD

The present invention relates to a fuse unit directly attached to a battery.

BACKGROUND ART

Various types of fuse units to be directly attached to batteries have been conventionally proposed (see Patent Literature 1). FIG. 1 shows a related art of such fuse units. In FIG. 1, a fuse unit 100 is fixed to a battery post 102 of a battery 101 via a battery terminal 103. The fuse unit 100 includes a unit body 105 and a battery cover 140. The unit body 105 includes a bus bar 110 being a conductive metal plate and an insulating protection 120 provided on an outer surface of the bus bar 110 by insert molding.

The battery terminal 103 is connected to the bus bar 110. The bus bar 110 has: a power supply connection portion 111 receiving power supply from the battery post 102; a starter motor connection portion 112 to which a starter motor terminal 130 is connected; an alternator connection portion 113 to which an alternator terminal 131 is connected; load connection portions (not illustrated) to which load terminals (not illustrated) are respectively connected; an alternator fuse 115 disposed between the power supply connection portion 111 and the alternator connection portion 113; and multiple load fuses 116 each disposed between the power supply connection portion 111 and a corresponding one of the load connection portions (not illustrated).

The unit body 105 has an L-shape bent at right angles and is disposed along a top surface 101a and a side surface 101b of the battery 101. The unit body 105 is thus installed in a peripheral space of the battery 101 which is allotted for the fuse unit 100.

The battery cover 140 has an almost box shape whose bottom is opened. The battery cover 140 includes a cover body 141 and a lid 143 turnably supported by the cover body 141 via a hinge 142. A side surface cover 144 is provided to extend in a portion below one side end of the cover body 141. The side surface cover 144 functions as a slide guide when the battery cover 140 is mounted by sliding. Specifically, in the mounting of the battery cover 140, the battery cover 140 is slid on the unit body 105 from above with the side surface cover 144 used as the slide guide. The battery cover 140 covers the battery post 102, the battery terminal 103, and the unit body 105 from above and from sides. The battery cover 140 serves to provide an insulating function, a waterproof function and the like of the fuse unit 100.

CITATION LIST

Patent Literature

[PTL 1] Japanese Unexamined Patent Application Publication No. 2002-289171

SUMMARY OF INVENTION

In the related art described above, the unit body 105 is turnable about the battery post 102 in the process of mounting the unit body 105 via the battery terminal 103. Accordingly, the unit body 105 is sometimes fixed to the battery post 102 with one end side of the unit body 105 abutting on the side surface 101b of the battery 101. When the unit body 105 is fixed at such an inclined position, the battery cover 140 might fail to be assembled because the battery cover 140 receives interference from the battery 101 while sliding on the unit body 105 from above. In such a case, it is necessary to unfasten the battery terminal 103, correctly locate the unit body 105 at a predetermined turn position, and fasten the battery terminal 103 again. Thus, the problem in this case is that the assemblability is poor.

An object of the present invention is to provide a fuse unit with an excellent assemblability of a battery cover.

An aspect of the present invention is a fuse unit comprising: a unit body fixed to a battery post of a battery via a battery terminal and disposed along a top surface and a side surface of the battery; and a battery cover mounted to the unit body and configured to cover an outer periphery of the unit body, wherein the unit body has a battery abutment rib at a portion of the unit body facing the side surface of the battery, the battery abutment rib configured to secure a mounting space for the battery cover.

The battery abutment rib may include ribs located respectively at right and left ends across the battery post.

In the configuration described above, even when the unit body is fixed at a position inclined with respect to the battery in the mounting of the unit body to the battery post via the battery terminal, the battery abutment rib abuts on the battery and the mounting space for the battery cover is thereby secured. Thus, the battery cover can be surely assembled. There is no need to unfasten the battery terminal, correctly locate the unit body at a predetermined turn position, or fasten the battery terminal again. Accordingly, the assemblability of the battery cover is excellent.

BRIEF DESCRIPTION OF DRAWINGS

FIG. 2(a) is a plan view showing a state where a unit body of a fuse unit is fixed to a battery and FIG. 2(b) is a side view showing the state where the unit body of the fuse unit is fixed to the battery.

FIG. 3(a) is a plan view showing a state where a battery cover of the fuse unit is assembled to the unit body and FIG. 3(b) is a side view showing the state where the battery cover of the fuse unit is assembled to the unit body.

FIG. 4(a) is a front view showing the unit body of the fuse unit, FIG. 4(b) is a right side view showing the unit body of the fuse unit, and FIG. 4(c) is a left side view showing the unit body of the fuse unit.

DESCRIPTION OF EMBODIMENTS

An embodiment of the present invention is described below based on the drawings.

Figure 1:
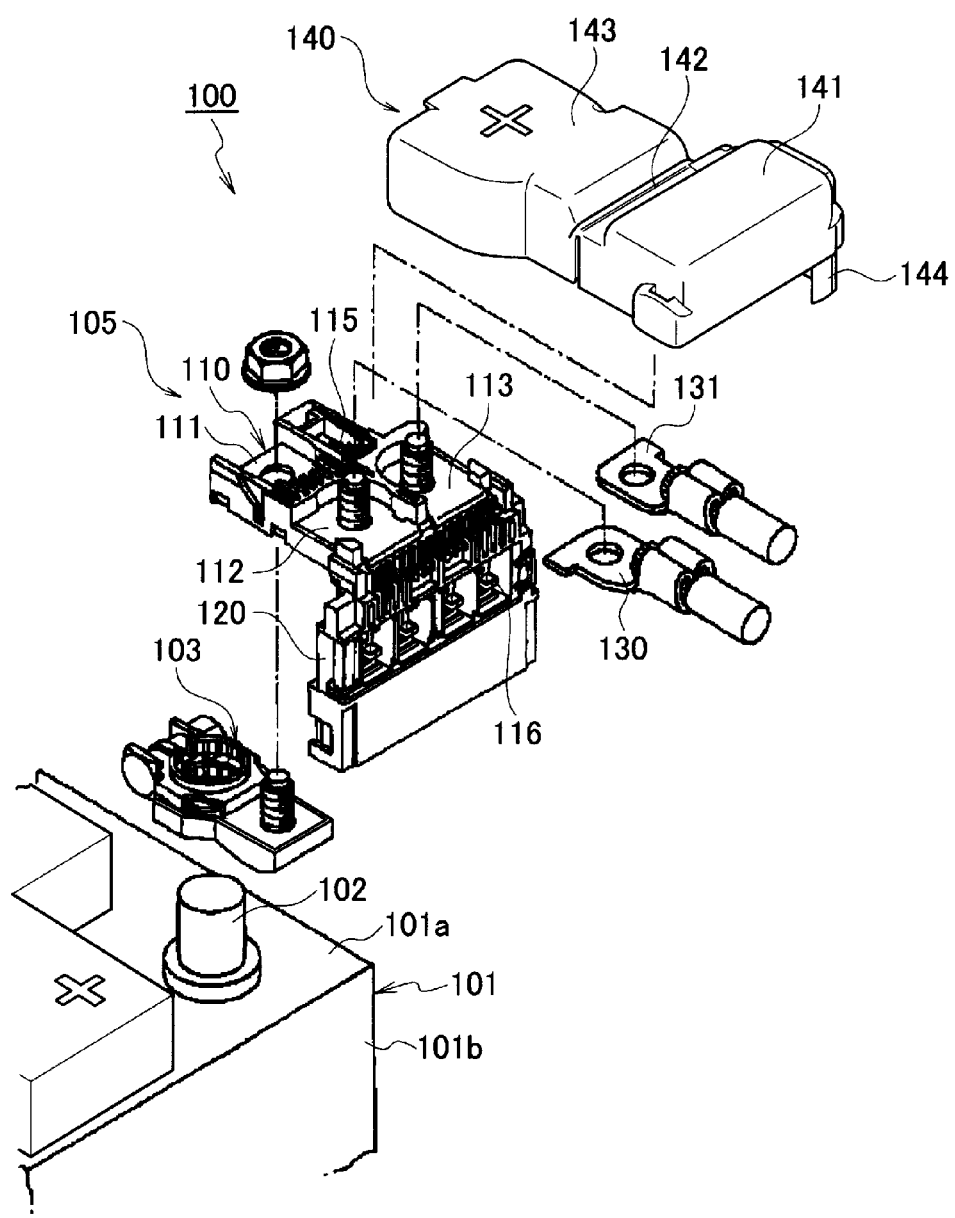
FIG. 1 is an exploded perspective view of a fuse unit of a related art.
Figure 2:
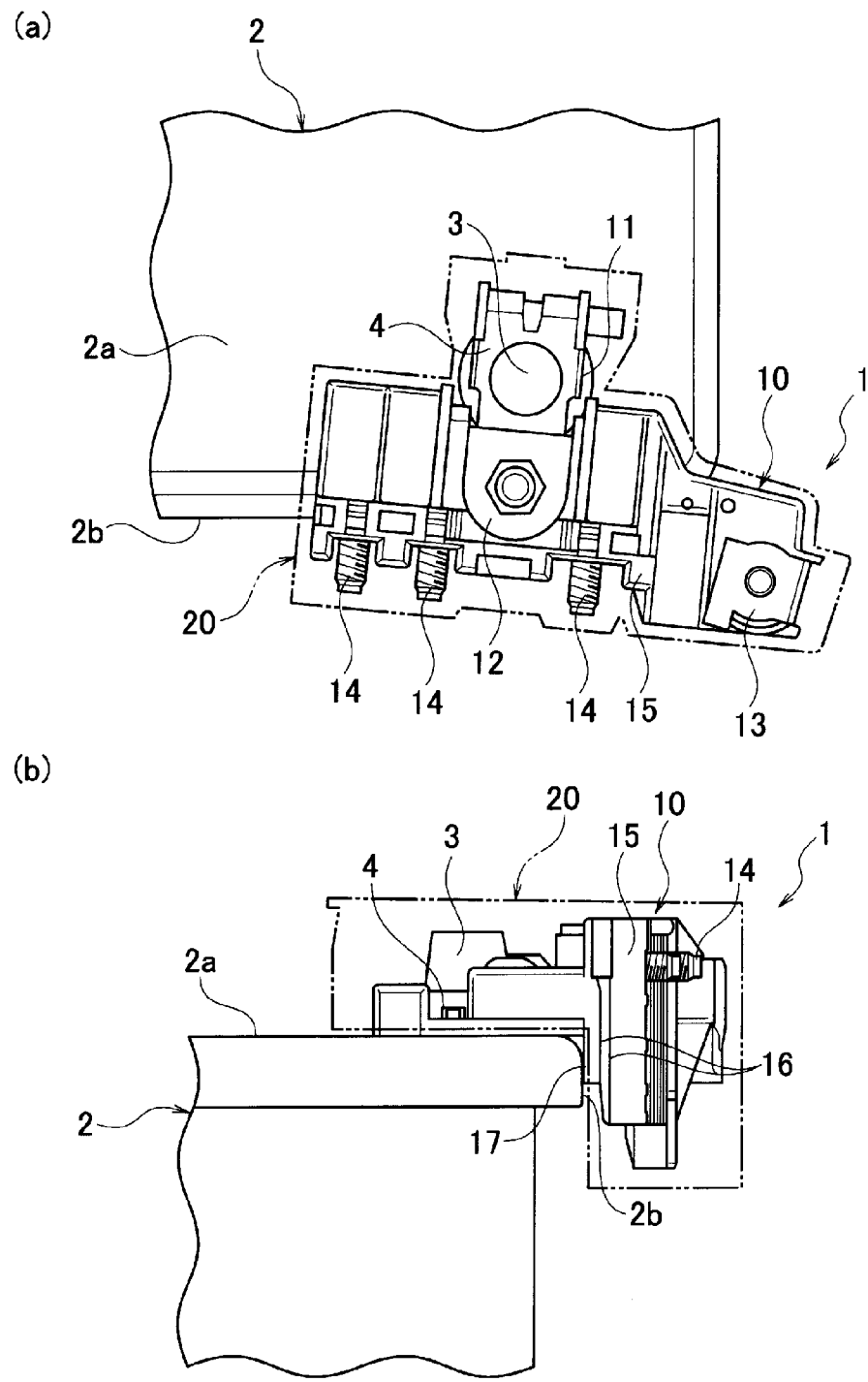
FIG. 2 illustrates an embodiment of the present invention.
Figure 6:
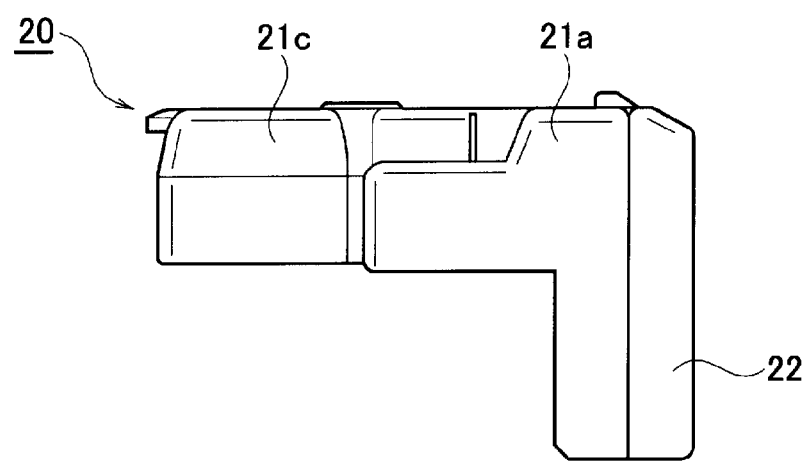
FIG. 6 is a side view showing the battery cover of the fuse unit of the embodiment of the present invention.

FIGS. 2 to 6 show the embodiment of the present invention. As shown in FIGS. 2 and 6, a fuse unit 1 is fixed to a battery post 3 of a battery 2 via a battery terminal 4. The fuse unit 1 includes a unit body 10 and a battery cover 20. The unit body 10 has such a form that the unit body 10 is bent into an L-shape, and is disposed along a top surface 2a and a side surface 2b of the battery 2. The fuse unit 1 is thus disposed in a peripheral space of the battery 2.

Figure 3:
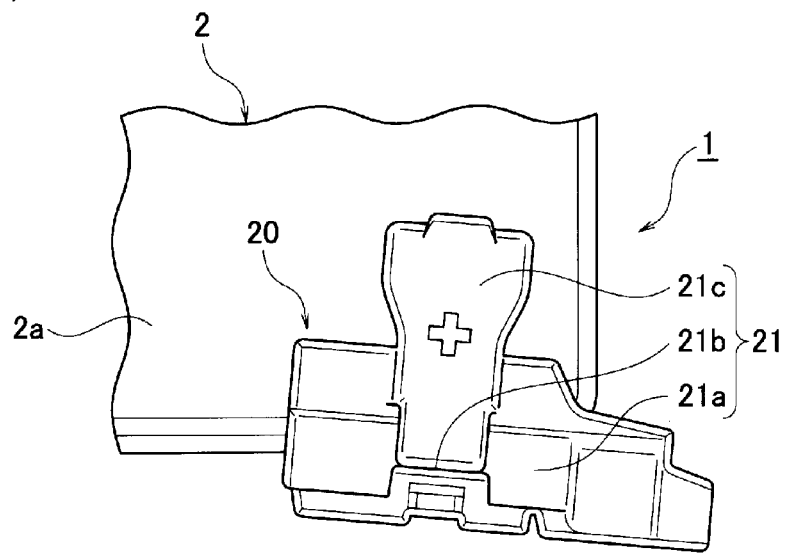
FIG. 3 illustrates the embodiment of the present invention.
Figure 3:
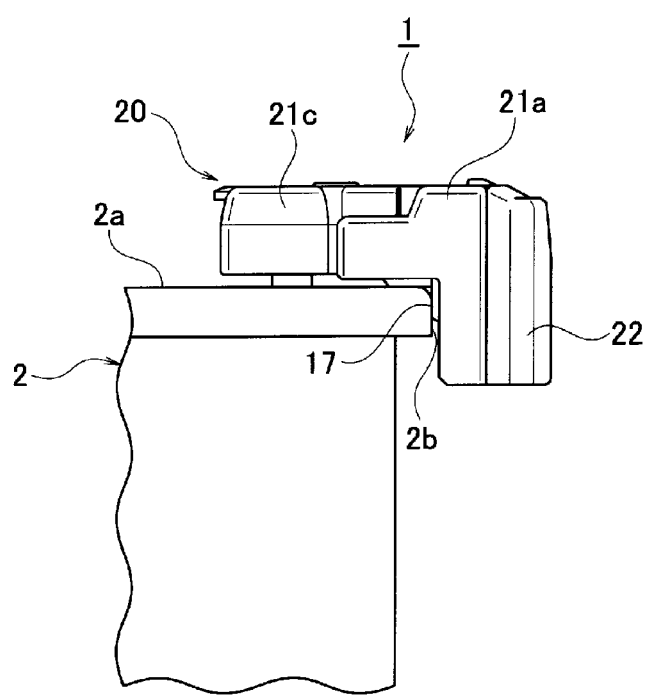
Figure 4:
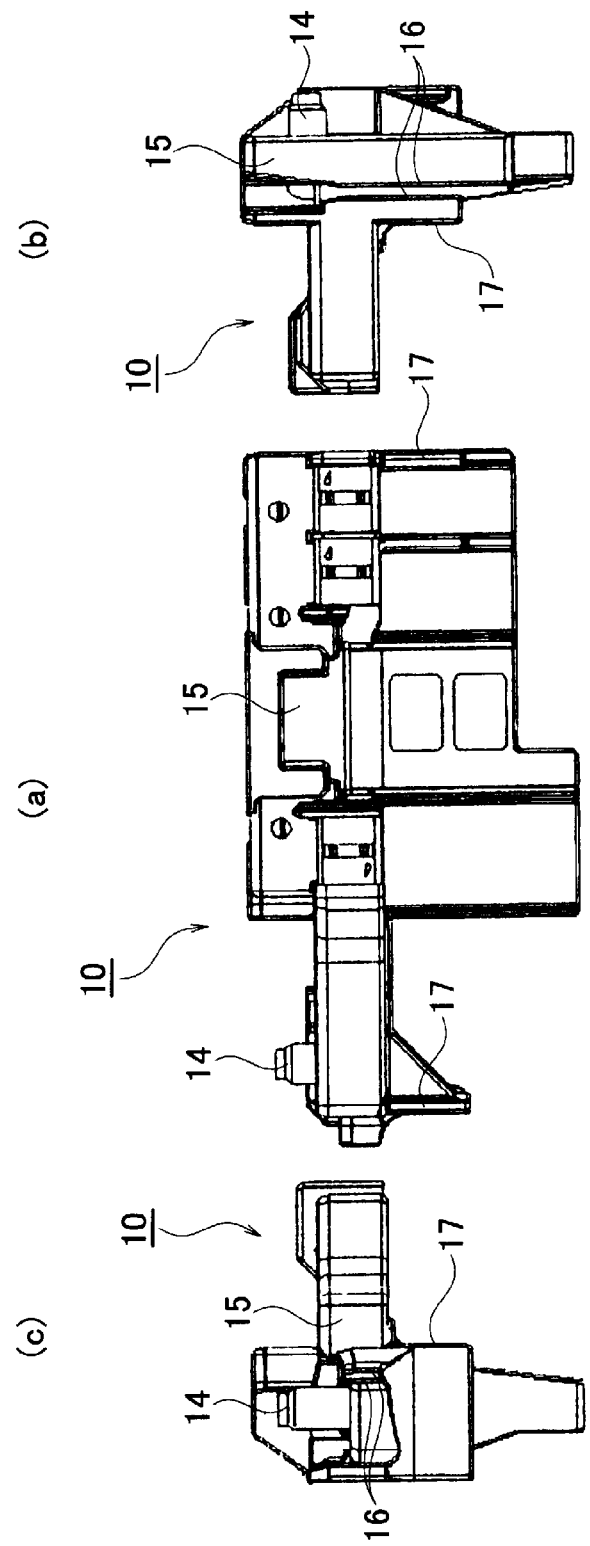
FIG. 4 illustrates the embodiment of the present invention.
Figure 5:
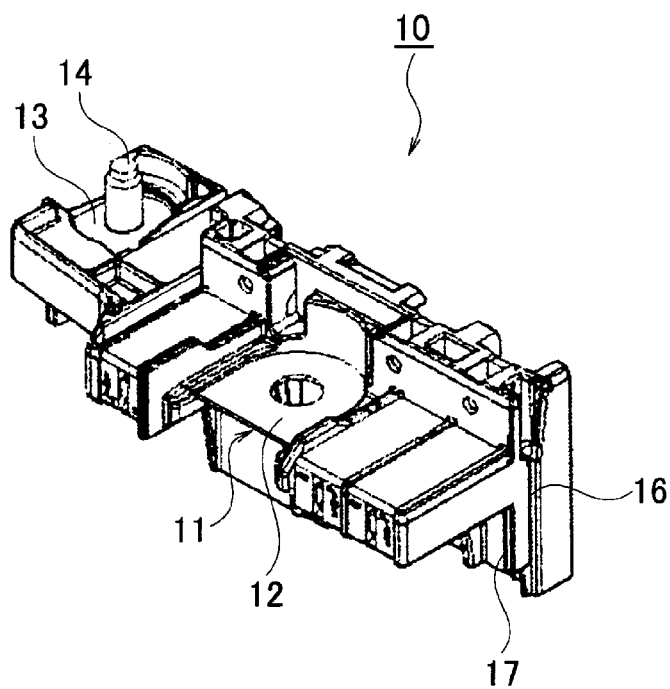
FIG. 5 is a perspective view showing the unit body of the fuse unit of the embodiment of the present invention.

As shown in detail in FIGS. 2, 3, and 4, the unit body 10 includes a bus bar 11 being a conductive metal plate and an insulating protection 15 provided on an outer surface of the bus bar 11 by insert molding. The bus bar 11 has: a power supply connection portion 12 to which the battery terminal 4 is connected; multiple external connection portions 13 (not all are illustrated) to which external terminals are respectively connected; and multiple fuses (not illustrated) each disposed between the power supply connection portion 12 and a corresponding one of the external connection portions 13. Each of the external connection portions 13 (not all are illustrated) has a stud bolt 14 and is connected to a corresponding one of the external terminals by being fastened thereto with the bolt. Each of the fuses (not illustrated) fuses when an overcurrent flows.

The insulating protection 15 covers almost the entire outer surface of the bus bar 11 except for the power supply connection portion 12, the external connection portions 13 (not all are illustrated), and the fuses (not illustrated). Slide rails 16 are provided respectively in right and left side surface portions of the insulating protection 15. Battery abutment ribs 17 are provided respectively in right and left side ends of the insulating protection 15, i.e. in right and left end portions of the insulating protection 15 across the battery post 3 in a battery mounted state. The battery abutment ribs 17 protrude further outward toward the battery 2 than other surfaces. By this protrusion, the battery abutment ribs 17 secure a mounting space for the battery cover 20 even in a state where the unit body 10 abuts on the side surface 2b of the battery 2.

As shown in detail in FIGS. 3 and 6, the battery cover 20 has an almost box shape whose bottom is opened. The battery cover 20 is made of an insulating synthetic resin material. The battery cover 20 is mounted by sliding the battery cover 20 on the unit body 10 from above. The battery cover 20 includes a top surface cover 21 and a side surface cover 22 extending downward from the top surface cover 21.

The top surface cover 21 covers the battery terminal 4 and the battery post 3 from above in addition to the unit body 10. The top surface cover 21 has a fixed surface portion 21a, a hinge 21b, and a lid 21c connected to the fixed surface portion 21a via the hinge 21b. The lid 21c protrudes further outward toward the battery 2 than the fixed surface portion 21a. The battery post 3, the battery terminal 4, the power supply connection portion 12, and the like can be exposed by opening the lid 21c upward about the hinge 21b and thus setting the lid 21c to an opened position. The side surface cover 22 covers the unit body 10 from sides. Guide portions (not illustrated) to be guided by the slide rails 16 are provided respectively on the inner sides of right and left side surfaces of the side surface cover 22. The battery cover 20 serves an insulating function, a waterproof function, and the like of the fuse unit 1.

In the configuration described above, when the unit body 10 is mounted to the battery post 3 of the battery 2 via the battery terminal 4, the unit body 10 is turnable about the battery post 3. Accordingly, as shown in FIGS. 2(a) and 2(b), the unit body 10 is sometimes fixed to the battery post 3 in a state where the unit body 10 is inclined with respect to the battery 2 with one of the battery abutment ribs 17 abutting on the side surface 2b of the battery 2. Even when the unit body 10 is in such a fixed position, the mounting space for the battery cover 20 is secured by the existence of the battery abutment ribs 17. Accordingly, as shown in FIGS. 3(a) and 3(b), the battery cover 20 can be assembled to the unit body 10 by sliding, even when the unit body 10 is in such a fixed position. Hence, there is no need to unfasten the battery terminal 4 once, correctly locate the unit body 10 at a predetermined turn position, or fasten the battery terminal 4 again as in the related art described above, and the assemblability of the battery cover 20 is thereby excellent.

The battery abutment ribs 17 are provided respectively in the right and left end portions of the insulating protection 15 across the battery post 3 while the battery 2 is in the mounted state. Accordingly, the mounting space for the battery cover 20 can be secured even when the unit body 10 is fixed while being inclined in any direction to the right or to the left with respect to the battery 2.

The fuse unit 1 has been described above based on the embodiment illustrated in the drawings. However, the invention is not limited to the embodiment, and the configuration of parts can be replaced with any configuration having the similar function.

The invention claimed is:

1. A fuse unit comprising:
a unit body fixed to a battery post provided on a top surface of a battery via a battery terminal and disposed along the top surface and a single side surface of the battery to be mounted to the battery, the unit body being turnable about the battery post when the unit body is mounted to the battery; and
a battery cover mounted to the unit body and configured to cover an outer periphery of the unit body,
wherein the unit body has a battery abutment rib at a portion of the unit body facing the single side surface of the battery, the battery abutment rib configured to abut on the single side surface of the battery upon the unit body being fixed at a position inclined with respect to the battery to secure a mounting space for the battery cover,
wherein the battery abutment rib protrudes further outward toward the battery than other surfaces of the unit body facing the single side surface of the battery, and
wherein the battery abutment rib includes ribs located respectively at right and left ends across the battery post.

2. The fuse unit according to claim 1, wherein only a single rib of the ribs is configured to abut on the single side surface of the battery upon the unit body being fixed at the position inclined with respect to the battery.

3. The fuse unit according to claim 1, further comprising:
an insulating protection, separate from the battery cover, which covers an outer surface of a bus bar of the unit body; and
slide rails provided respectively at right and left sides of the insulating protection,
wherein the battery cover slides on the slide rails.

4. The fuse unit according to claim 1,
wherein the battery cover includes a fixed surface portion extending over the top surface of the battery and a lid extending from the fixed surface portion along the top surface and attached by a hinge to the fixed surface portion, and
wherein the lid is rotatable away from the top surface about the hinge while the fixed surface portion remains fixed.

* * * * *